(12) United States Patent
Chiang et al.

(10) Patent No.: US 11,163,384 B2
(45) Date of Patent: Nov. 2, 2021

(54) ROLLER WHEEL MODULE

(71) Applicants: LITE-ON ELECTRONICS (GUANGZHOU) LIMITED, Guangzhou (CN); Lite-On Technology Corporation, Taipei (TW)

(72) Inventors: Hsiao-Lung Chiang, Taipei (TW); Chen-Yu Tsai, Taipei (TW); Hong-Che Yen, Taipei (TW)

(73) Assignees: LITE-ON ELECTRONICS (GUANGZHOU) LIMITED, Guangzhou (CN); Lite-On Technology Corporation, Taipei (TW)

( * ) Notice: Subject to any disclaimer, the term of this patent is extended or adjusted under 35 U.S.C. 154(b) by 0 days.

(21) Appl. No.: 16/924,217

(22) Filed: Jul. 9, 2020

(65) Prior Publication Data

US 2021/0200336 A1  Jul. 1, 2021

Related U.S. Application Data (60) Provisional application No. 62/954,647, filed on Dec. 29, 2019.

(30) Foreign Application Priority Data

May 14, 2020 (CN) .......................... 202010405910.3

(51) Int. Cl.
  G06F 3/0362 (2013.01)
  G06F 3/0354 (2013.01)
  G06F 3/02 (2006.01)

(52) U.S. Cl.
  CPC ........ *G06F 3/0362* (2013.01); *G06F 3/03541* (2013.01); *G06F 3/0213* (2013.01)

(58) Field of Classification Search
  CPC ... G06F 3/0362; G06F 3/03541; G06F 3/0231
  See application file for complete search history.

(56) References Cited

U.S. PATENT DOCUMENTS

| | | | |
|---|---|---|---|
| 2013/0027306 A1* | 1/2013 | Peng | G06F 3/0362 345/163 |
| 2020/0159341 A1* | 5/2020 | Unnikrishnan | G06F 3/0362 |

* cited by examiner

*Primary Examiner* — Hang Lin
(74) *Attorney, Agent, or Firm* — JCIPRNET (57) ABSTRACT

A roller wheel module includes a roller wheel, an elastic member, and an adjustment assembly. The roller wheel includes a ratchet structure and has a configuration surface. The configuration surface is divided into a blank region and a ratchet region. The ratchet structure is disposed on the configuration surface and is located in the ratchet region. The elastic member is disposed next to the roller wheel and has a first end and a second end opposite to each other. The first end of the elastic member is connected to the adjustment assembly, and the adjustment assembly drives the second end of the elastic member to move between the blank region and the ratchet region. The roller wheel module allows the user to switch between a ratchet rotating mode and a smooth rolling mode according to requirements, and allows the user to quickly scrolling and have a better touch feel.

20 Claims, 6 Drawing Sheets

ROLLER WHEEL MODULE

CROSS-REFERENCE TO RELATED APPLICATION

This application claims the priority benefit of U.S. provisional application Ser. No. 62/954,647, filed on Dec. 29, 2019, and China application serial no. 202010405910.3, filed on May 14, 2020. The entirety of each of the above-mentioned patent applications is hereby incorporated by reference herein and made a part of this specification.

BACKGROUND

Technical Field

The disclosure relates to a roller wheel module, and in particular, to a roller wheel module applied to an input device.

Description of Related Art

Input devices including mice, keyboards, joysticks, touch pads and the like are typically used together with Windows interface applications and may be configured to control the display positions of cursors on screens and to click open applications or to perform other related functions through function keys. At present, roller wheels of mice do not allow users to perform quickly scrolling and do not provide a ratchet rotating mode nor a smooth rolling mode to deal with fast computer manipulation. In addition, in order to increase speed and to provide a favorable touch feel, metal materials are adopted most of the time to make the outer surface of the roller wheel of a mouse. That is, the roller wheel has a metal surface. Nevertheless, since metal materials requiring considerable costs are adopted as the materials for outer surfaces of the roller wheels, product costs of mice are high.

SUMMARY

The disclosure provides a roller wheel module which may be switched between a ratchet rotating mode and a smooth rolling mode by a user him/herself according to needs, allows the user to perform quickly scrolling, and provides a favorable touch feel.

According to an embodiment of the disclosure, a roller wheel module includes a roller wheel, an elastic member, and an adjustment assembly. The roller wheel includes a ratchet structure and has a configuration surface. The configuration surface is divided into a blank region and a ratchet region. The ratchet structure is disposed on the configuration surface and is located in the ratchet region. The elastic member is disposed next to the roller wheel and has a first end and a second end opposite to each other. The first end of the elastic member is connected to the adjustment assembly, and the adjustment assembly drives the second end of the elastic member to move between the blank region and the ratchet region. When the adjustment assembly drives the elastic member to be located in the ratchet region, the second end of the elastic member leans against the ratchet structure, so that the roller wheel is in the ratchet rotating mode. When the adjustment assembly drives the elastic member to be located in the blank region, the second end of the elastic member leans against the configuration surface of the roller wheel, so that the roller wheel is in the smooth rolling mode.

In the roller wheel module provided by an embodiment of the disclosure, the roller wheel includes a plastic housing, a weight block, and a plastic cover. The plastic housing has the configuration surface and a peripheral surface connected to the configuration surface. The peripheral surface and the configuration surface define an accommodating cavity. The weight block is disposed in the accommodating cavity. The plastic cover is disposed on the plastic housing to fix the weight block in the accommodating cavity.

In the roller wheel module provided by an embodiment of the disclosure, the roller wheel module further includes a rubber ring sleeved on the peripheral surface of the plastic housing.

In the roller wheel module provided by an embodiment of the disclosure, the ratchet structure further extends and is disposed on the peripheral surface of the plastic housing. The plastic housing and the ratchet structure are integrally formed.

In the roller wheel module provided by an embodiment of the disclosure, a material of the weight block includes metal or stainless steel.

In the roller wheel module provided by an embodiment of the disclosure, the elastic member includes a spring or a torsion spring.

In the roller wheel module provided by an embodiment of the disclosure, the roller wheel module further includes a carrier having a pivot portion. The roller wheel is disposed on the carrier, and the adjustment assembly is pivotally connected to the pivot portion.

In the roller wheel module provided by an embodiment of the disclosure, the adjustment assembly includes a sliding member and a scrolling post. The sliding member includes a sliding block and a sleeve shaft connected to each other. The sleeve shaft is pivotally connected to the pivot portion of the carrier, and the sliding block has an opening. The scrolling post is disposed in the opening of the sliding block and is adapted to be scrolled to push the sliding member to move.

In the roller wheel module provided by an embodiment of the disclosure, the roller wheel module further includes an encoder disposed next to the roller wheel, and an axle core of the roller wheel penetrates through the encoder.

In the roller wheel module provided by an embodiment of the disclosure, the roller wheel module further includes at least one switch disposed on at least one side of the roller wheel.

According to an embodiment of the disclosure, a roller wheel module includes a carrier, a roller wheel, an elastic member, a sliding member, and a scrolling post. The carrier has an accommodation opening and a pivot portion. The roller wheel is disposed in the accommodation opening of the carrier and includes a ratchet structure and has a configuration surface. The configuration surface is divided into a blank region and a ratchet region. The ratchet structure is disposed on the configuration surface and is located in the ratchet region. The elastic member is disposed next to the roller wheel and has a first end and a second end opposite to each other. The sliding member is pivotally connected to the pivot portion of the carrier and has an opening. The first end of the elastic member is connected to the sliding member. The scrolling post is disposed in the opening of the sliding member and is adapted to be scrolled to push the sliding member to move to drive the second end of the elastic member to move between the blank region and the ratchet region. When the sliding member drives the elastic member to be located in the ratchet region, the second end of the elastic member leans against the ratchet structure, so that the roller wheel is in the ratchet rotating mode. When the sliding member drives the elastic member to be located in the blank region, the second end of the elastic member leans against the configuration surface of the roller wheel, so that the roller wheel is in the smooth rolling mode.

In the roller wheel module provided by an embodiment of the disclosure, the roller wheel includes a plastic housing, a weight block, and a plastic cover. The plastic housing has the configuration surface and a peripheral surface connected to the configuration surface. The peripheral surface and the configuration surface define an accommodating cavity. The weight block is disposed in the accommodating cavity. The plastic cover is disposed on the plastic housing to fix the weight block in the accommodating cavity.

In the roller wheel module provided by an embodiment of the disclosure, the roller wheel module further includes a rubber ring sleeved on the peripheral surface of the plastic housing.

In the roller wheel module provided by an embodiment of the disclosure, the ratchet structure further extends and is disposed on the peripheral surface of the plastic housing. The plastic housing and the ratchet structure are integrally formed.

In the roller wheel module provided by an embodiment of the disclosure, a material of the weight block includes metal or stainless steel.

In the roller wheel module provided by an embodiment of the disclosure, the elastic member includes a spring or a torsion spring.

In the roller wheel module provided by an embodiment of the disclosure, the roller wheel module further includes a base and a circuit board. The scrolling post is disposed on the base. The circuit board is disposed on the base and has a sliding slot. The scrolling post penetrates through the sliding slot and is adapted to move in the sliding slot.

In the roller wheel module provided by an embodiment of the disclosure, the roller wheel module includes at least one switch disposed on the circuit board and is electrically connected to the circuit board.

In the roller wheel module provided by an embodiment of the disclosure, the roller wheel module further includes an encoder disposed next to the roller wheel, and an axle core of the roller wheel penetrates through the encoder. The encoder is electrically connected to the circuit board through a plurality of electrical wires.

In the roller wheel module provided by an embodiment of the disclosure, the roller wheel module includes a plurality of screwing members penetrating through the circuit board and fixing the circuit board onto the base.

To sum up, in the design of the roller wheel module provided by the disclosure, the roller wheel includes the ratchet structure and has the configuration surface divided into the blank region and the ratchet region, and the ratchet structure is disposed on the configuration surface and is located in the ratchet region. When the adjustment assembly drives the elastic member to be located in the ratchet region, the second end of the elastic member leans against the ratchet structure, so that the roller wheel is in the ratchet rotating mode. When the adjustment assembly drives the elastic member to be located in the blank region, the second end of the elastic member leans against the configuration surface of the roller wheel, so that the roller wheel is in the smooth rolling mode. In this way, the roller wheel module may be switched between the ratchet rotating mode and the smooth rolling mode by the user him/herself according to needs, and the user may perform quickly scrolling and is provided with a favorable touch feel.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Descriptions of the disclosure are given with reference to the exemplary embodiments illustrated by the accompanying drawings. Wherever possible, the same reference numbers are used in the drawings and the description to refer to the same or like parts.

Figure 1A:
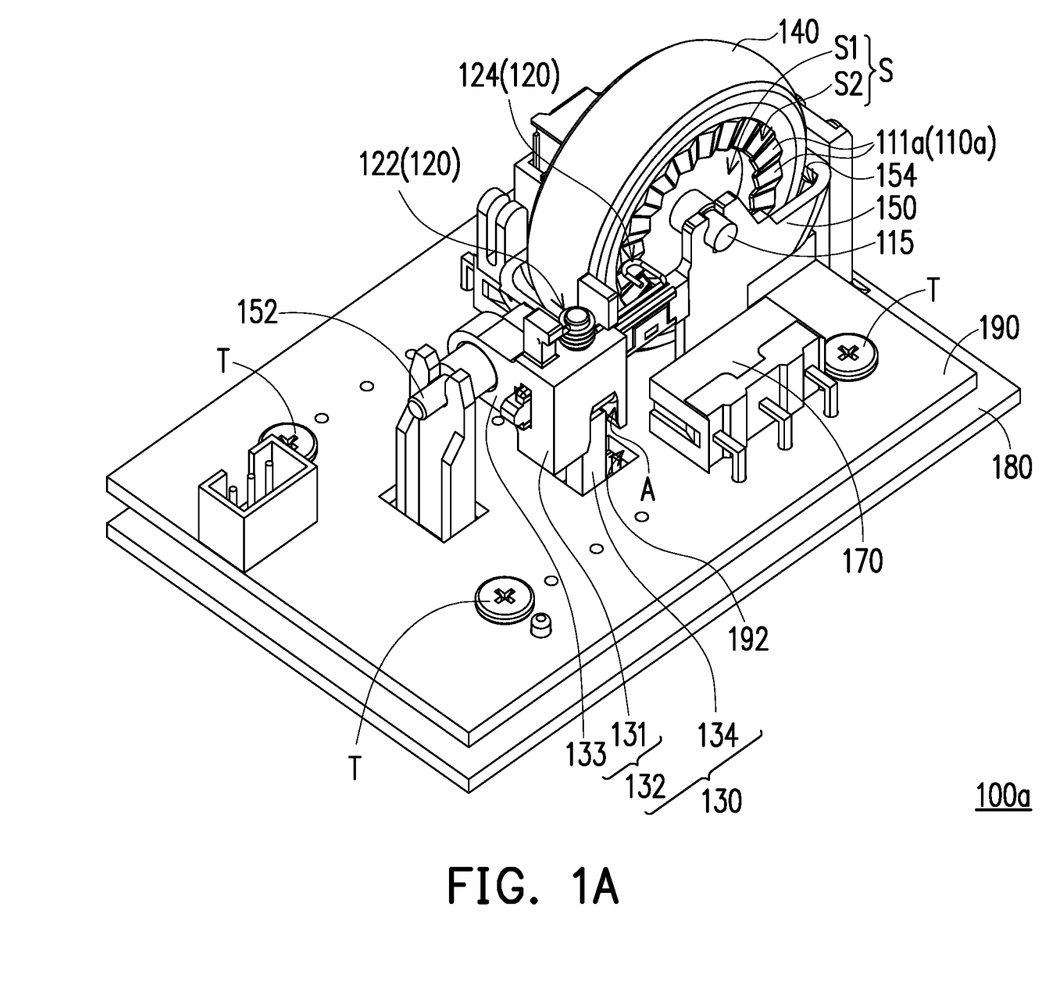
FIG. 1A is a schematic three-dimensional view of a roller wheel module according to an embodiment of the disclosure.
Figure 1B:
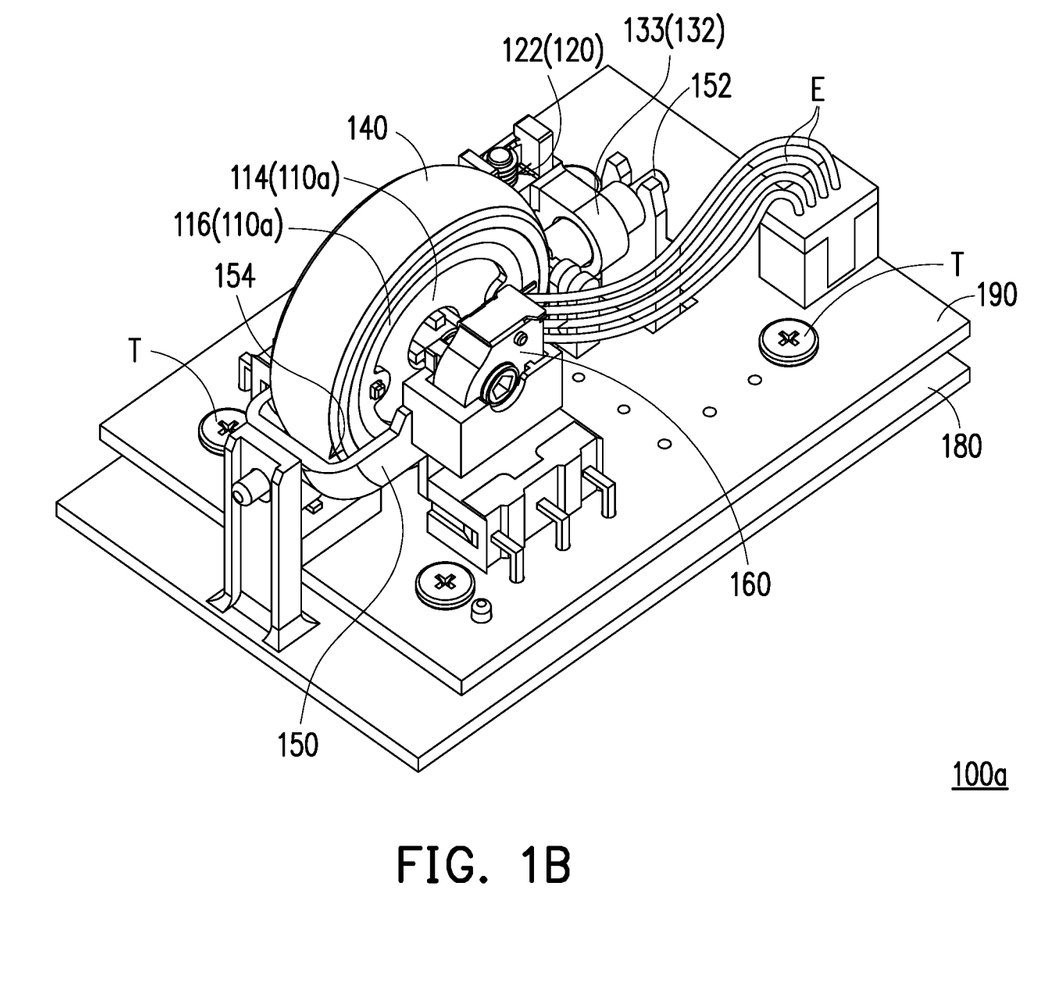
FIG. 1B is a schematic three-dimensional view of the roller wheel module in FIG. 1A from another viewing angle.
Figure 1C:
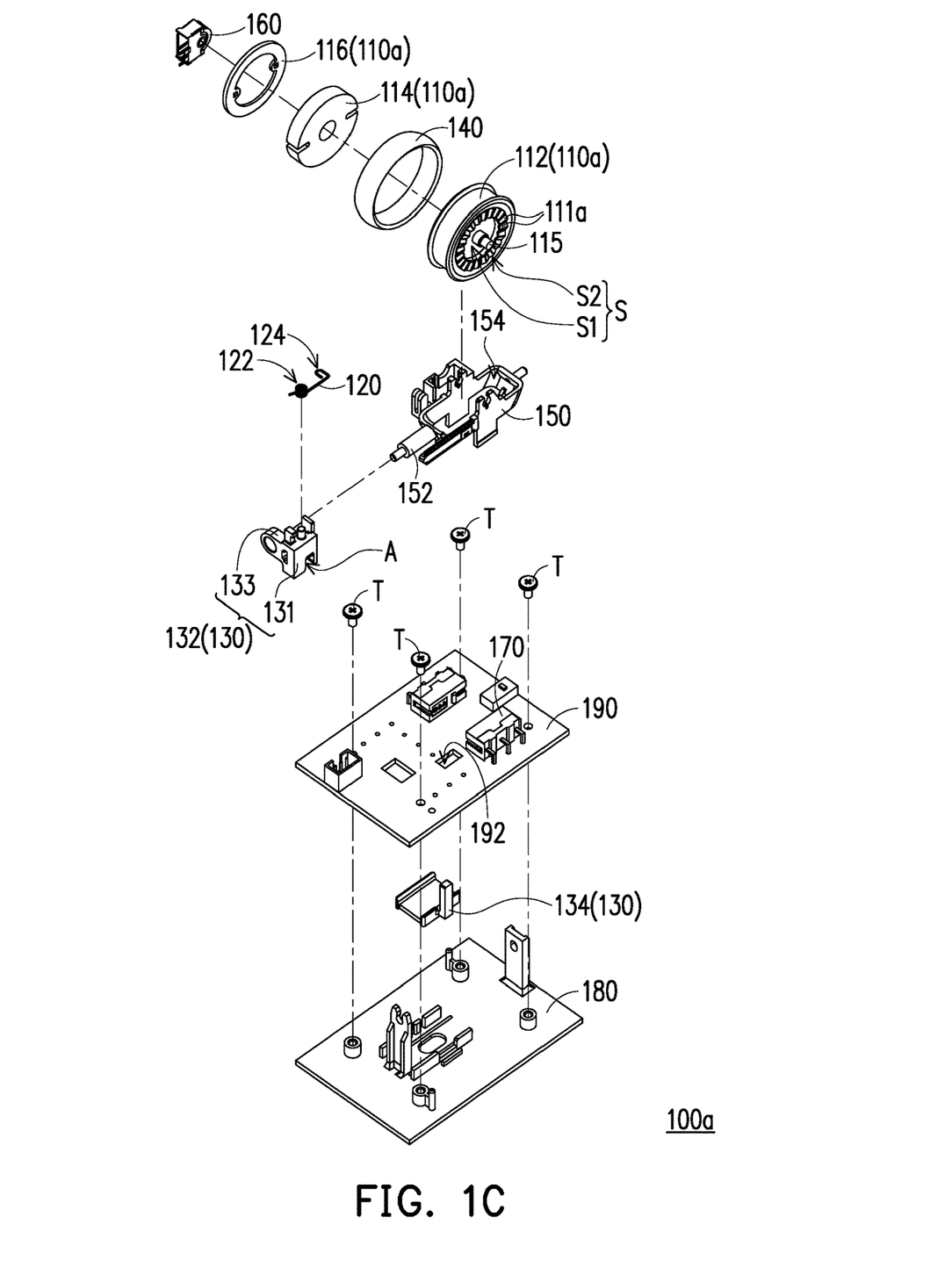
FIG. 1C is a schematic three-dimensional exploded view of the roller wheel module in FIG. 1A.
Figure 1D:
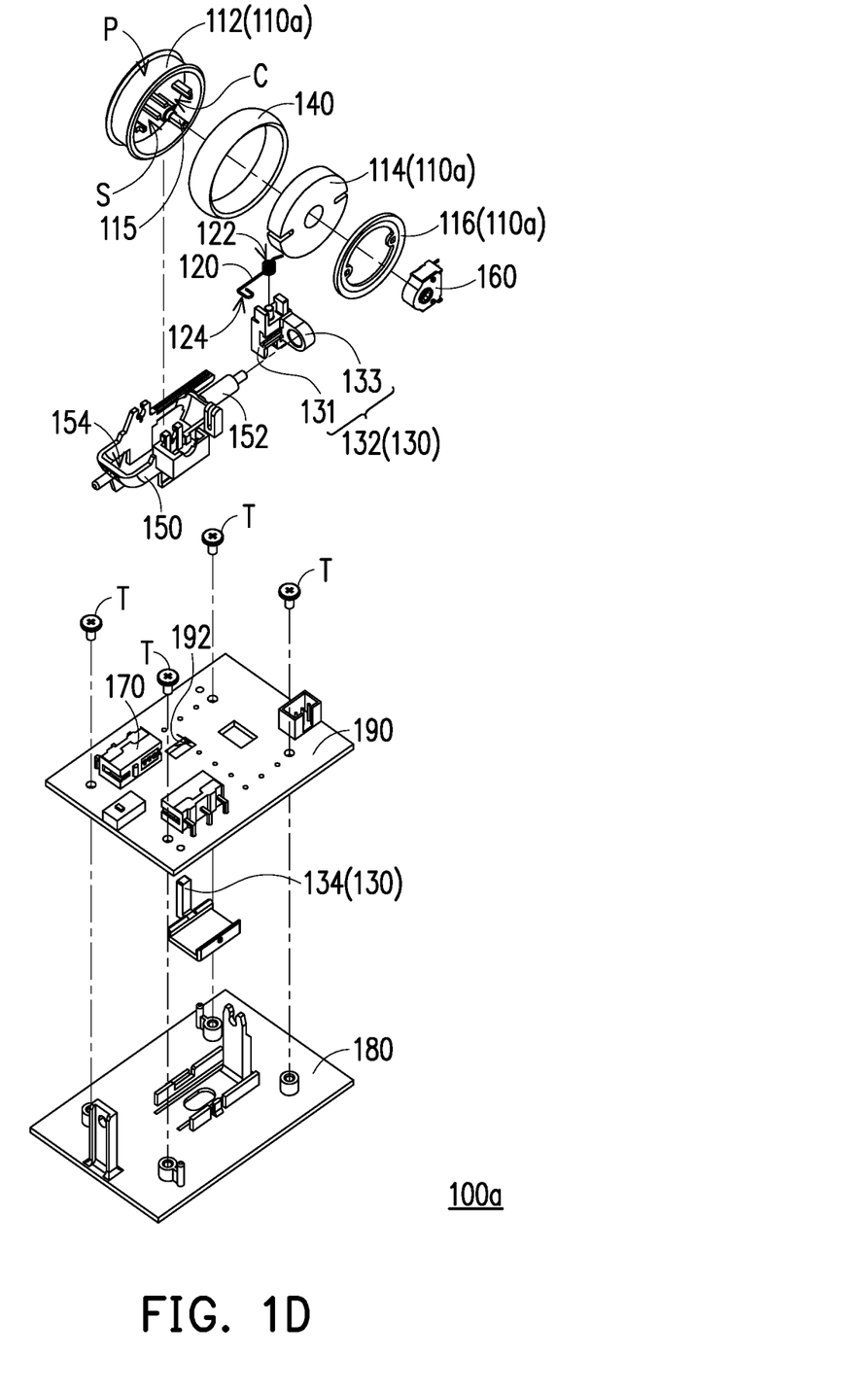
FIG. 1D is a schematic three-dimensional exploded view of the roller wheel module in FIG. 1A from another viewing angle.
Figure 1E:
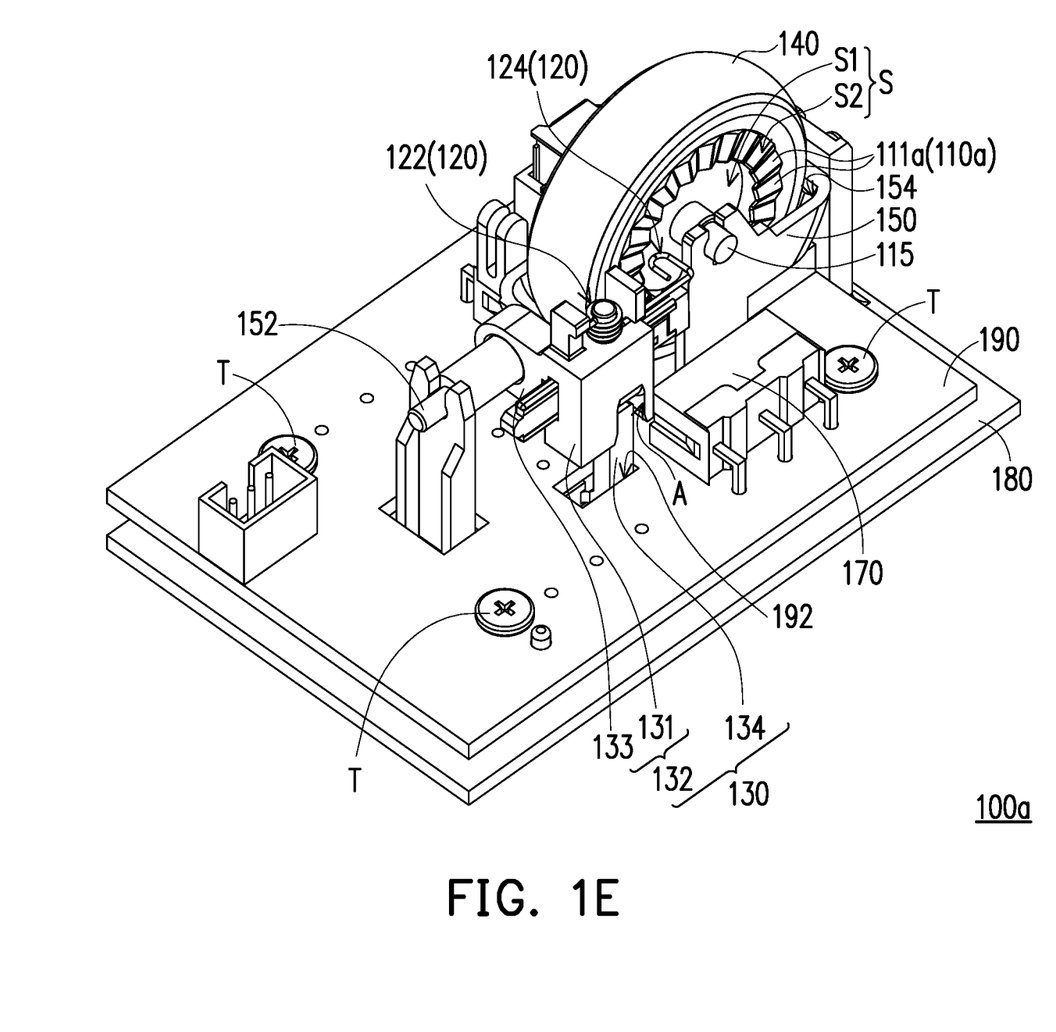
FIG. 1E is a schematic three-dimensional view of a second end of an elastic member of the roller wheel module in FIG. 1A located in a blank region.

FIG. 1A is a schematic three-dimensional view of a roller wheel module according to an embodiment of the disclosure. FIG. 1B is a schematic three-dimensional view of the roller wheel module in FIG. 1A from another viewing angle. FIG. 1C is a schematic three-dimensional exploded view of the roller wheel module in FIG. 1A. FIG. 1D is a schematic three-dimensional exploded view of the roller wheel module in FIG. 1A from another viewing angle. FIG. 1E is a schematic three-dimensional view of a second end of an elastic member of the roller wheel module in FIG. 1A located in a blank region.

With reference to FIG. 1A and FIG. 1C together, in this embodiment, a roller wheel module 100a includes a roller wheel 110a, an elastic member 120, and an adjustment assembly 130. The roller wheel 110a includes a ratchet structure 111a and has a configuration surface S. The configuration surface S is divided into a blank region S1 and a ratchet region S2, and the ratchet region S2 surrounds the blank region S1. The ratchet structure 111a is disposed on the configuration surface S and is located in the ratchet region S2. The elastic member 120 is disposed next to the roller wheel 110a and has a first end 122 and a second end 124 opposite to each other. The first end 122 of the elastic member 120 is connected to the adjustment assembly 130, and the adjustment assembly 130 drives the second end 124 of the elastic member 120 to move between the blank region S1 and the ratchet region S2.

To be specific, with reference to FIG. 1B, FIG. 1C, and FIG. 1D together, the roller wheel 110a provided by this embodiment includes a plastic housing 112, a weight block 114, and a plastic cover 116. The plastic housing 112 includes the configuration surface S and a peripheral surface P connected to the configuration surface S. An extending direction of the peripheral surface P is perpendicular to an extending direction of the configuration surface S. The peripheral surface P and the configuration surface S define an accommodating cavity C. The weight block 114 is disposed in the accommodating cavity C, and the plastic cover 116 is disposed on the plastic housing 112 to fix the weight block 114 in the accommodating cavity C. Herein, the weight block 114 and the ratchet structure 111a are respectively located on two opposite sides of the configuration surface S. The roller wheel 110a provided by this embodiment has a plastic appearance, and a weight of the roller wheel 110a is increased through arrangement of the weight block 114. A material of the weight block 114 is, for example, metal or stainless steel to increase inertia. A diameter of the weight block 114 may be, for example, 21 millimeters, and a thickness of the weight block 114 may be, for example, 4 millimeters.

Next, with reference to FIG. 1A, FIG. 1C, and FIG. 1D together, the elastic member 120 provided by this embodiment is, for example, a spring or a torsion spring. The first end 122 of the elastic member 120 is sleeved on the adjustment assembly 130 to be connected to the adjustment assembly 130. Further, the second end 124 of the elastic member 120 interferes with the configuration surface S or the ratchet structure 111a, and in this way, a rolling mode of the roller wheel 110a may be changed, that is, a ratchet feeling may or may not be generated. In the conventional art, a pivot arm mechanism is adopted for a mouse to adjust the rolling type of a roller wheel. Nevertheless, in this embodiment, the elastic member 120 exhibiting favorable elasticity is adopted instead, and an elastic arm which may be further extended is provided, and in this way, a simple structure is presented, and easy manufacturing may thus be achieved.

Further, with reference to FIG. 1A, FIG. 1C, and FIG. 1D together, the adjustment assembly 130 provided by this embodiment includes a sliding member 132 and the scrolling post 134. The first end 122 of the elastic member 120 is connected to the sliding member 132, and the sliding member 132 includes a sliding block 131 and a sleeve shaft 133 connected to each other. The sliding block 131 has an opening A, and the arrangement of the sleeve shaft 133 can stabilize the sliding block 131. The scrolling post 134 is disposed in the opening A of the sliding block 131 and is adapted to push the sliding member 132 to move in a direction of the roller wheel 110a or in a direction away from the roller wheel 110a, so as to drive the second end 124 of the elastic member 120 to move between the blank region S1 and the ratchet region S2. With reference to FIG. 1A and FIG. 1E together, when the scrolling post 134 pushes the sliding member 132 to move in the direction of the roller wheel 110a, the second end 124 of the elastic member 120 enters the blank region S1 from the ratchet region S2. When the scrolling post 134 pushes the sliding member 132 to move in the direction away from the roller wheel 110a, the second end 124 of the elastic member 120 retreats to the ratchet region S2 from the blank region S1. Herein, the sliding block 131 and the sleeve shaft 133 may be integrally formed, but the disclosure is not limited thereto.

Further, with reference to FIG. 1A and FIG. 1D again, the roller wheel module 100a provided by this embodiment further includes a rubber ring 140. The rubber ring 140 is sleeved on the peripheral surface P of the plastic housing 112, and in this way, friction is increased, and a favorable touch feel is also provided. Herein, the rubber ring 140 is an annulus and may be produced by in-mold double injection or post-processing assembly. Through arrangement of the rubber ring 140, the roller wheel 110a may provide a favorable touch feel.

As shown in FIG. 1A, FIG. 1C, and FIG. 1D, the roller wheel module 100a provided by this embodiment further includes a carrier 150, and the carrier 150 has a pivot portion 152 and an accommodation opening 154. The roller wheel 110a may be rotatably disposed on the carrier 150 and is accommodated in the accommodation opening 154. The sleeve shaft 133 of the sliding member 132 of the adjustment assembly 130 is pivotally connected to the pivot portion 152 of the carrier 150. To be specific, the pivot portion 152 of the carrier 150 is sleeved in the sliding member 133 of the sleeve shaft 132.

Further, with reference to FIG. 1B, the roller wheel module 100a provided by this embodiment further includes an encoder 160. The encoder 160 is disposed next to the roller wheel 110a, and an axle core 115 of the roller wheel 110a penetrates through the encoder 160. The encoder 160 is designed to be place on a left side or a right side of the roller wheel 110a, which is not limited herein.

In addition, with reference to FIG. 1A, the roller wheel module 100a provided by this embodiment includes at least one switch 170 (one switch 170 is schematically shown), and the switch 170 is disposed on at least one side of the roller wheel 110a. Herein, the switch 170 is located below the roller wheel 110a, and space saving is thus achieved in this way. With reference to FIG. 1A and FIG. 1B together, in this embodiment, the encoder 160 and the switch 170 are respectively disposed on the left and right sides of the roller wheel 110a. Nevertheless, the encoder 160 and the switch 170 may also be disposed on the same side of the roller wheel 110a, as long as the roller wheel 110a is adapted to turn on the switch 170. Arrangement of the encoder 160 and the switch 170 is not particularly limited in the disclosure.

Besides, with reference to FIG. 1A, FIG. 1C, and FIG. 1D together, the roller wheel module 100a provided by this embodiment further includes a base 180 and a circuit board 190. Herein, the base 180 may be, for example, a base seat of a mouse or a board member of a keyboard, but is not limited thereto. That is, the roller wheel module 100a provided by this embodiment may be applied to a mouse or a keyboard, but is not limited thereto. The circuit board 190 is, for example, a printed circuit board (PCB), is disposed on the base 180, and has a sliding slot 192. The scrolling post 134 of the adjustment assembly 130 is disposed on the base 180, and one end of the scrolling post 134 penetrates through the sliding slot 192 of the circuit board 190 and is located in the opening A of the sliding block 131. An extending direction of the sliding slot 192 of the circuit board 190 is identical to an extending direction of the pivot portion 152 of the carrier 150, and the scrolling post 134 is adapted to move in the sliding slot 192. Besides, the switch 170 provided by this embodiment is disposed on the circuit board 190 and is electrically connected to the circuit board 190.

As shown in FIG. 1B, the encoder 160 provided by this embodiment may be electrically connected to the circuit board 190 through a plurality of electrical wires E. Herein, the encoder 160 has a plurality of phases and may provide a signal to the circuit board 190 along with rotation of the roller wheel 110a, so as to identify a rotation direction of the roller wheel 110a. Besides, as shown in FIG. 1C and FIG. 1D, the roller wheel module 100a provided by this embodiment further includes a plurality of screwing members T penetrating through the circuit board 190 and fixing the circuit board 190 on the base 180. Herein, the screwing members T are, for example, screws or bolts, which are not particularly limited.

With reference to FIG. 1A again, when the user scrolls the scrolling post 134 of the adjustment assembly 130 to push the sliding member 132 to drive the elastic member 120 to be located in the ratchet region S2, the second end 124 of the elastic member 120 leans against the ratchet structure 111a, so that the roller wheel 110a is in a ratchet rotating mode. In contrast, with reference to FIG. 1E again, when the user scrolls the scrolling post 134 of the adjustment assembly 130 to push the sliding member 132 to drive the elastic member 120 to be located in the blank region S1, the second end 124 of the elastic member 120 leans against the configuration surface S of the roller wheel 110a, so that the roller wheel 110a is in a smooth rolling mode. The smooth rolling mode described here means no ratchet feeling or shuttling.

In short, in the design of the roller wheel module 100a provided by this embodiment, the roller wheel 110a includes the ratchet structure 111a and has the configuration surface S divided into the blank region S1 and the ratchet region S2, and the ratchet structure 111a is disposed on the configuration surface S and is located in the ratchet region S2. When the adjustment assembly 130 drives the elastic member 120 to be located in the ratchet region S2, the second end 124 of the elastic member 120 leans against the ratchet structure 111a, so that the roller wheel 110a is in the ratchet rotating mode. When the adjustment assembly 130 drives the elastic member 120 to be located in the blank region S1, the second end 124 of the elastic member 120 leans against the configuration surface S of the roller wheel 110a, so that the roller wheel 110a is in the smooth rolling mode. In this way, the roller wheel module 100a may be switched between the ratchet rotating mode and the smooth rolling mode by the user him/herself according to needs, and the user may perform quickly scrolling and is provided with a favorable touch feel. In addition, in this embodiment, since the second end 124 of the elastic member 120 may interfere with the configuration surface S or the ratchet structure 111a to change the rolling mode of the roller wheel 110a, a ratchet feeling thereby may or may not be generated. In the conventional art, a pivot arm mechanism is adopted for a mouse to adjust the rolling type of a roller wheel. Nevertheless, in this embodiment, the elastic member 120 exhibiting favorable elasticity is adopted instead, and an elastic arm which may be further extended is provided, and in this way, a simple structure is presented, and easy manufacturing may thus be achieved.

It should be noted that the reference numerals and a part of the contents in the previous embodiment are used in the following embodiments, in which identical reference numerals indicate identical or similar components, and repeated description of the same technical contents is omitted. Please refer to the descriptions of the previous embodiment for the omitted contents, which will not be repeated hereinafter.

Figure 2:
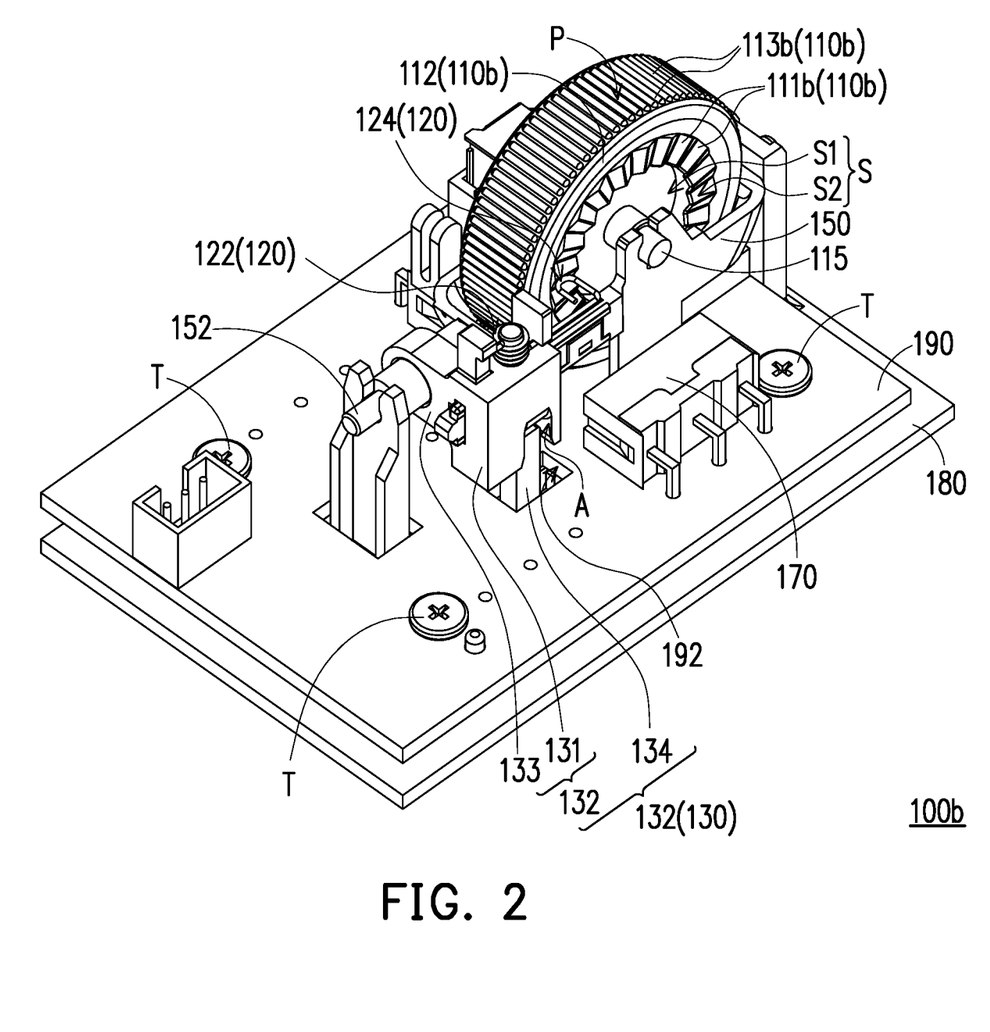
FIG. 2 is a schematic three-dimensional view of a roller wheel module according to another embodiment of the disclosure.

FIG. 2 is a schematic three-dimensional view of a roller wheel module according to another embodiment of the disclosure. With reference to FIG. 1A and FIG. 2 together, a roller wheel module 100b provided by this embodiment is similar to the roller wheel module 100a in FIG. 1A, and a difference therebetween lies in that: a roller wheel 110b provided by this embodiment further includes a ratchet structure 113b. To be specific, in addition to a ratchet structure 111b disposed on the configuration surface S and located in the ratchet region S2, the ratchet structure 113b is further included in this embodiment, which extends and is disposed on the peripheral surface P of the plastic housing 112. Herein, the plastic housing 112, the ratchet structure 111b, and the ratchet structure 113b are integrally formed preferably. That is, the roller wheel 110b provided by this embodiment has a plastic appearance. Since the ratchet structure 113b is disposed on the peripheral surface P of the plastic housing 112 of the roller wheel 110b, friction may be increased, so that the user is provided with a favorable touch feel when touching the roller wheel 110b.

In view of the foregoing, in the design of the roller wheel module provided by the disclosure, the roller wheel includes the ratchet structure and has the configuration surface divided into the blank region and the ratchet region, and the ratchet structure is disposed on the configuration surface and is located in the ratchet region. When the adjustment assembly drives the elastic member to be located in the ratchet region, the second end of the elastic member leans against the ratchet structure, so that the roller wheel is in the ratchet rotating mode. When the adjustment assembly drives the elastic member to be located in the blank region, the second end of the elastic member leans against the configuration surface of the roller wheel, so that the roller wheel is in the smooth rolling mode. In this way, the roller wheel module may be switched between the ratchet rotating mode and the smooth rolling mode by the user him/herself according to needs, and the user may perform quickly scrolling and is provided with a favorable touch feel. In addition, in the disclosure, since the second end of the elastic member interferes with the configuration surface or the ratchet structure to change the rolling mode of the roller wheel, a ratchet feeling thereby may or may not be generated. In the conventional art, a pivot arm mechanism is adopted for a mouse to adjust the rolling type of a roller wheel. Nevertheless, in the disclosure, the elastic member exhibiting favorable elasticity is adopted instead, and an elastic arm which may be further extended is provided, and in this way, a simple structure is presented, and easy manufacturing may thus be achieved.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:
1. A roller wheel module, comprising:
a roller wheel, comprising a ratchet structure and having a configuration surface, wherein the configuration surface is divided into a blank region and a ratchet region, and the ratchet structure is disposed on the configuration surface and is located in the ratchet region;
an elastic member, disposed next to the roller wheel, having a first end and a second end opposite to each other; and
an adjustment assembly, wherein the first end of the elastic member is connected to the adjustment assembly, and the adjustment assembly drives the second end of the elastic member to move between the blank region and the ratchet region, wherein the second end of the elastic member leans against the ratchet structure so that the roller wheel is in a ratchet rotating mode when the adjustment assembly drives the elastic member to be located in the ratchet region, and the second end of the elastic member leans against the configuration surface of the roller wheel so that the roller wheel is in a smooth rolling mode when the adjustment assembly drives the elastic member to be located in the blank region, wherein the roller wheel comprises a housing and a weight block, the housing has the configuration surface and a peripheral surface connected to the configuration surface, the peripheral surface and the configuration surface define an accommodating cavity, and the weight block is disposed in the accommodating cavity.

2. The roller wheel module according to claim 1, wherein the housing is a plastic housing and the roller wheel comprises:

a plastic cover, disposed on the plastic housing to fix the weight block in the accommodating cavity.

3. The roller wheel module according to claim 2, further comprising:

a rubber ring, sleeved on the peripheral surface of the plastic housing.

4. The roller wheel module according to claim 2, wherein the ratchet structure further extends and is disposed on the peripheral surface of the plastic housing, and the plastic housing and the ratchet structure are integrally formed.

5. The roller wheel module according to claim 2, wherein a material of the weight block comprises metal or stainless steel.

6. The roller wheel module according to claim 1, wherein the elastic member comprises a spring or a torsion spring.

7. The roller wheel module according to claim 1, further comprising:

a carrier, comprising a pivot portion, wherein the roller wheel is disposed on the carrier, and the adjustment assembly is pivotally connected to the pivot portion.

8. The roller wheel module according to claim 7, wherein the adjustment assembly comprises:

a sliding member, comprising a sliding block and a sleeve shaft connected to each other, wherein the sleeve shaft is pivotally connected to the pivot portion of the carrier, and the sliding block has an opening; and a scrolling post, disposed in the opening of the sliding block, adapted to push the sliding member to move.

9. The roller wheel module according to claim 1, further comprising:

an encoder, disposed next to the roller wheel, wherein an axle core of the roller wheel penetrates through the encoder.

10. The roller wheel module according to claim 1, further comprising:

at least one switch, disposed on at least one side of the roller wheel.

11. A roller wheel module, comprising:

a carrier, comprising an accommodation opening and a pivot portion;

a roller wheel, disposed in the accommodation opening of the carrier, comprising a ratchet structure and having a configuration surface, wherein the configuration surface is divided into a blank region and a ratchet region, and the ratchet structure is disposed on the configuration surface and is located in the ratchet region;

an elastic member, disposed next to the roller wheel, having a first end and a second end opposite to each other;

a sliding member, pivotally connected to the pivot portion of the carrier, comprising an opening, wherein the first end of the elastic member is connected to the sliding member; and a scrolling post, disposed in the opening of the sliding member, adapted to push the sliding member to move to drive the second end of the elastic member to move between the blank region and the ratchet region, wherein the second end of the elastic member leans against the ratchet structure so that the roller wheel is in a ratchet rotating mode when the sliding member drives the elastic member to be located in the ratchet region, and the second end of the elastic member leans against the configuration surface of the roller wheel so that the roller wheel is in a smooth rolling mode when the sliding member drives the elastic member to be located in the blank region.

12. The roller wheel module according to claim 11, wherein the roller wheel comprises:

a plastic housing, having the configuration surface and a peripheral surface connected to the configuration surface, wherein the peripheral surface and the configuration surface define an accommodating cavity;

a weight block, disposed in the accommodating cavity; and a plastic cover, disposed on the plastic housing to fix the weight block in the accommodating cavity.

13. The roller wheel module according to claim 12, further comprising:

a rubber ring, sleeved on the peripheral surface of the plastic housing.

14. The roller wheel module according to claim 12, wherein the ratchet structure further extends and is disposed on the peripheral surface of the plastic housing, and the plastic housing and the ratchet structure are integrally formed.

15. The roller wheel module according to claim 12, wherein a material of the weight block comprises metal or stainless steel.

16. The roller wheel module according to claim 11, wherein the elastic member comprises a spring or a torsion spring.

17. The roller wheel module according to claim 11, further comprising:

a base, wherein the scrolling post is disposed on the base; and a circuit board, disposed on the base, comprising a sliding slot, wherein the scrolling post penetrates through the sliding slot and is adapted to move in the sliding slot.

18. The roller wheel module according to claim 17, further comprising:

at least one switch, disposed on the circuit board and electrically connected to the circuit board.

19. The roller wheel module according to claim 17, further comprising:

an encoder, disposed next to the roller wheel, wherein an axle core of the roller wheel penetrates through the encoder, wherein the encoder is electrically connected to the circuit board through a plurality of electrical wires.

20. The roller wheel module according to claim 17, further comprising:

a plurality of screwing members, penetrating through the circuit board and fixing the circuit board onto the base.

* * * * *